Sept. 15, 1959

F. B. SELLERS ET AL 2,904,445

PORTLAND CEMENT MANUFACTURE FROM OIL SHALE

Filed May 4, 1956

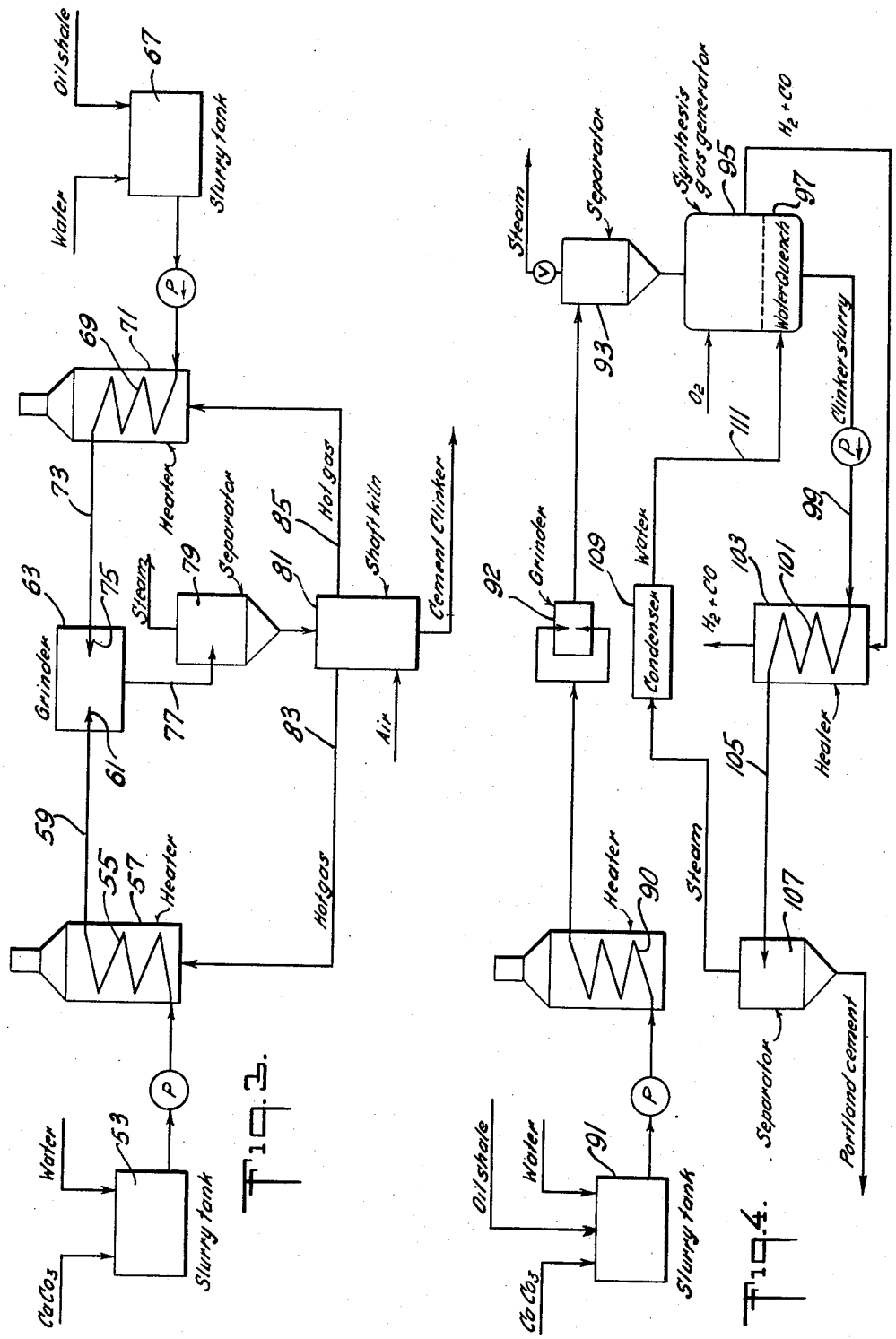

United States Patent Office 2,904,445
Patented Sept. 15, 1959

2,904,445

PORTLAND CEMENT MANUFACTURE FROM OIL SHALE

Frederick B. Sellers, Tarrytown, and Henry M. Chapin, Dobbs Ferry, N.Y., assignors to Texaco Development Corporation, New York, N.Y., a corporation of Delaware Application May 4, 1956, Serial No. 582,799

8 Claims. (Cl. 106—100)

The present invention relates to a novel cement product and to a process for manufacturing cement clinker and finished cement from argillaceous oil shale mixed with a calcareous material such as limestone, with or without the concurrent production of synthesis gas comprising hydrogen and carbon monoxide.

Oil shale deposits are widely distributed throughout the world, and vary just as widely in composition. For example, the recoverable shale oil content may vary from as little as 20 to as much as 120 gallons per ton of oil shale. We propose to employ oil shale as an ingredient of Portland cement, and to burn all or part of the combustible organic material in the shale as the source of heat for sintering the cement clinker. Since the combustion of a minimum of 15 to 20 gallons of oil per ton of oil shale is required for sintering cement, depending on the specific nature of the oil, we also propose to provide a procedure whereby any excess oil over that required for sintering can be recovered as usable oil. For a typical U.S. oil shale containing 50 gallons per ton, as much as 30 gallons of shale oil per ton can be recovered concurrently with cement manufacture.

In accordance with this invention cement clinker is manufactured continuously by forming a flowable mixture comprising coarse particles of oil shale in a vaporizable liquid such as water, passing the mixture through an elongated tubular heating zone, heating the mixture as it flows through the heating zone to a temperature above the boiling point of the liquid so as to vaporize liquid and form a dispersion of solid particles in the resulting vapor, and disintegrating the oil shale particles by passing the dispersion through a succeeding zone of high velocity flow wherein the flowing stream is subjected to extreme turbulence and a velocity sufficiently great to effect disintegration by the application of fluid energy. Velocity should be in excess of 25 feet per second, and usually much higher, such as hundreds or even thousands of feet per second.

When it is desired or necessary to burn all of the combustible content of the oil shale to supply heat for subsequent sintering to form cement clinker, the temperature in the shale disintegrating operation described above should be low enough to avoid release of shale oil by decomposition of the kerogen in the shale. At operating pressures greater than 300 pounds per square inch gauge, the temperature, to avoid decomposition, should not exceed about 800° F.

However, some oil shales contain so much more kerogen than is required to supply heat for the sintering step that it is possible to decompose a part of the kerogen and recover it as shale oil during the shale disintegrating operation, the remainder in the shale then being burned for sintering the cement clinker. To effect such oil recovery, the temperature in the shale disintegrating operation should be above 800° F., and preferably in the range of 850 to 950° F. The recovered oil may be later refined and converted to useful petroleum products such as motor fuel, lubricating oil, and the like. Alternatively, part or all of the recovered shale oil can be burned for heating the flowable mixture of oil shale in liquid during the shale disintegration operation.

Pressure usually may be between 500 and 2000 p.s.i.g., and a pressure drop of 200 to 500 p.s.i. or more is advantageous to development of the necessary flow conditions for disintegration.

The stream containing finely ground solids suspended therein is discharged from the high velocity zone and passed to a sintering zone in intimate mixture with finely ground calcareous material. In the sintering zone the organic content of the oil shale is ignited and burned to supply heat for sintering the mixed cement ingredients. The sintering temperature normally is 2500–3000° F., but effective results can be obtained at higher and lower temperatures.

While the calcereous material may be ground in any desired way prior to the sintering step, we prefer to grind it by the same fluid energy grinding steps described above for oil shale. This can be done either wholly independently of the oil shale grinding, or the coarse calcareous particles can be incorporated with the flowable mixture of oil shale particles and liquid, and ground concurrently therewith.

An advantageous economy feature of this invention involves employing heat from the sintering zone as part or all of the heating medium for vaporizing liquid from the flowable mixture.

Reference is made to U.S. Patent 2,735,787 for a disclosure of the grinding of solid materials by vaporizing liquid from a slurry and passing the resulting dispersion in high velocity turbulent flow. Reference is also made to the pending U.S. application Ser. No. 537,386, now U.S. Patent No. 2,846,150, of Lincoln T. Work for a disclosure of employing the slurry grinding principles with opposed nozzles for discharging jets of dispersion against one another to effect disintegration. The conditions of temperature, pressure, velocity, and liquid character described in the above patent and application also apply to the grinding phase of the present invention.

The invention will be described more in detail below with reference to the drawings wherein.

Fig. 3 is a schematic flow diagram showing an arrangement of apparatus whereby both the oil shale and the calcium carbonate are separately formed into flowing dispersions, which are then impacted together for disintegration prior to being fed to a kiln; and Fig. 4 is a schematic flow diagram showing apparatus for grinding a mixture of oil shale and calcium carbonate, simultaneously sintering the disintegrated mixture and generating synthesis gas therefrom, and then grinding up the resulting cement clinker.

Oil shale occurs throughout the world in tremendous deposits, the compositions varying greatly from one deposit to another with respect to ash and organic content. Generally the ash usable as a cement ingredient ranges between 25 and 70% by weight, and contains varying amounts of oxides of such elements as silicon, iron, aluminum, calcium and magnesium. The balance is mostly organic bituminous matter, known as kerogen. The analyses of deposits of oil shale and limestone to be used in cement manufacture can be easily determined, and used as a basis for establishing the proper proportions of oil shale and calcareous material. In general the proportions should be designed to give a Portland cement of good commercial quality, such as within the following nominal composition ranges; it being understood that the metals are generally present in complex compounds such as silicates rather than as simple oxides:

| | Percent by weight |
|---|---|
| $SiO_2$ | 19 to 23 |
| $Al_2O_3$ | 6 to 9 |
| $Fe_2O_3$ | 2.5 to 5 |
| CaO | 60 to 63 |
| MgO | .4 to 4 |

Figure 1:
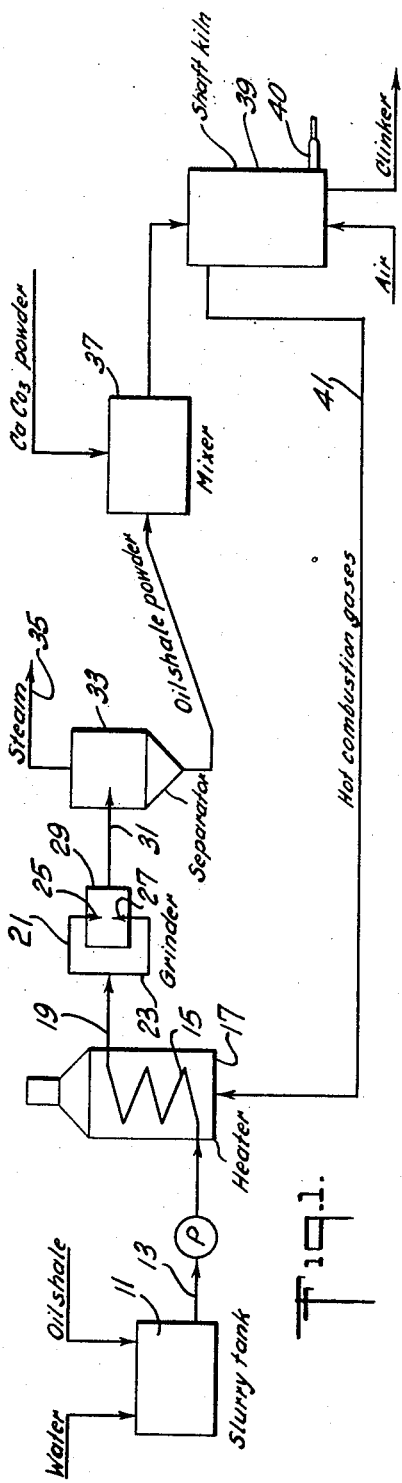
Fig. 1 is a schematic flow diagram showing one arrangement of apparatus for performing the invention, while employing hot gases of combustion from a kiln to vaporize liquid from a slurry.

Referring to Fig. 1 of the drawings, a flowable mixture such as a slurry or extrudable paste is made up in a tank 11 by introducing rough ground coarse oil shale particles into a body of water in the proper proportions and mixing them thoroughly together. The proportions of solids to water may vary widely, as between 2:1 and 1:2 by weight, a proportion of 1:1 being advantageous.

The mixture is then pumped through a conduit 13 into a steel pipe coil 15 in a heater 17 wherein it is heated to vaporize the water and form a flowing dispersion of solid particles in steam. This dispersion flows through an outlet conduit 19 and splits into two equal streams which pass through conduits 21 and 23 to a pair of diametrically opposed nozzles 25 and 27 in a grinding head 29. The passages in the two opposed nozzles are of much smaller cross-sectional area than the conduits 21 and 23, so that the velocities of the streams of dispersion are increased to high values, such as sonic velocity or higher. Upon leaving the nozzles 25 and 27 the two streams of dispersions collide at an angle of 180°. The solid particles are thus disintegrated to an extremely fine size.

The resulting steam dispersion of fine solid particles flows at relatively low velocity from the grinding head 29 through a large diameter conduit 31 and passes to a separator 33, such as a centrifugal cyclone type separator. Steam passes off the top through a conduit 35, while the hot solid particles are discharged from the bottom in a fine dry condition and are delivered to a mixer 37 wherein they are mixed intimately with finely ground limestone to form a Portland cement premix.

From mixer 37 the cement premix continuously passes into the top of a shaft kiln 39 through which air is blown to burn the organic content of the oil shale and develop a temperature such as 2500–3000° F. at which incipient fusion occurs and cement clinker is formed. Combustion of the organic content of the oil shale may be initiated and maintained in any suitable way, as by a small gas or oil flame discharging within the kiln from a burner 40.

After sintering in kiln 39 the clinker is discharged from the bottom and may be cooled and ground mechanically in a ball or tube mill to such fineness that not over 7 to 8% of the finished Portland cement product is retained on a 100 mesh U.S. standard sieve.

Economy of the process is assured by passing the hot gases from the kiln 39 at a temperature generally in excess of 1000° F. through a conduit 41 to the interior of the heater 17 where they heat the flowable mixture in coil 15 and form the dispersion previously described. The hot gases may be augmented by additional heat supplied by a gas or oil burner.

*Example I*

A slurry consisting of 50% by weight of water and 50% by weight of crushed oil shale (60 wt. percent ash and 40 wt. percent combustible organic material) is pumped continuously at 700 p.s.i.g. into 400 feet of coiled ½″ extra heavy steel pipe 15 at a rate of 800 lbs. per hour. During its passage through pipe coil 15 the slurry is heated to a maximum temperature of 700° F. and its water content is vaporized so as to form a flowing dispersion of oil shale particles in steam. The dispersion is then passed through a pair of 180° opposed nozzles 25 and 27 having orifices 5/32 inch in diameter, with resulting disintegration of the oil shale particles to a size such that 98% pass through a 325 mesh U.S. standard sieve.

After separation of steam in cyclone 33, the hot dry oil shale particles enter a mechanical mixer 37 wherein they are mixed intimately with ground limestone (96% calcium carbonate) supplied at a rate of 720 lbs. per hour, to form a cement premix.

The cement premix is then passed into shaft kiln 39 wherein it works its way gradually from the top to the bottom, while the organic content of the oil shale is burned, raising the temperature to about 2700° F. at which sintering occurs and cement clinker is formed.

Clinker having the following nominal analysis is continuously discharged from the shaft kiln at a rate of 650 lbs. per hour.

| Oxide: | Weight percent |
|---|---|
| $SiO_2$ | 22.3 |
| $Al_2O_3$ | 6.2 |
| $Fe_2O_3$ | 2.2 |
| CaO | 67.3 |
| MgO | 2.0 |

The metals, of course, are not necessarily present as the oxides, but usually exist in complex compounds such as silicates.

When recovering part of the shale oil content of the oil shale with the apparatus of Fig. 1, the flowable mixture in coil 15 is heated above 800° F., and a mixture of steam and shale oil vapors is removed through conduit 35 at the top of cyclone 33. The steam and vapors are subsequently condensed and separated from one another.

*Example II*

A slurry consisting of 50% by weight of water and 50% by weight of crushed Utah oil shale (60 wt. percent ash and 40 wt. percent kerogen; Fisher assay 50 gallons of oil per ton) is pumped continuously at 750 p.s.i.g. into 400 feet of coiled ½″ extra heavy steel pipe 15 at a rate of 1000 lbs. per hour. During its passage through pipe coil 15 the slurry is heated to a maximum temperature of 925° F. and the resulting dispersion of oil shale particles in steam is disintegrated as in Example I.

The dispersion enters cyclone 33 at 5 p.s.i.g. and the steam passes off the top along with 6 gallons per hour of shale oil vapor, which is about half the potential oil content of the oil shale. The steam and oil vapor are condensed, separated, and recovered.

The resulting oil has an API gravity of 20°, a pour point of 50° F., and an SUS viscosity at 100° F. of 300.

The hot dry oil shale particles containing about half the original content of combustible organic material as residue are then mixed with limestone supplied at a rate of 900 lbs. per hour and the mixture is sintered as in Example I to form cement clinker.

Figure 2:
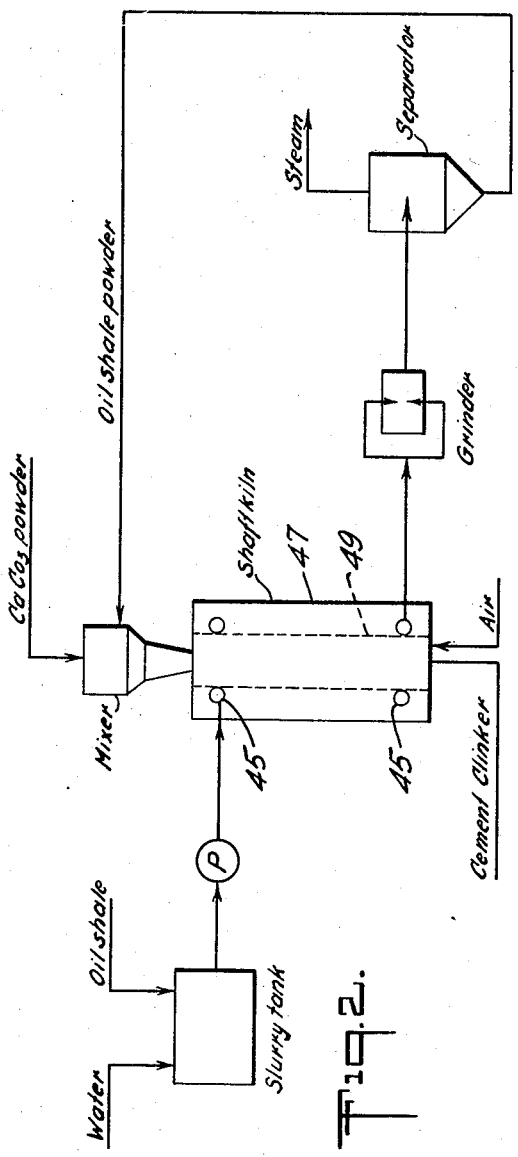
Fig. 2 is a schematic flow diagram showing a different arrangement of apparatus, providing for heating a slurry by passing it through a tube arranged within a kiln.

Referring to Fig. 2, the grinding of the oil shale is accomplished in the same manner as described above, but is modified by heating the slurry and dispersion by passing them through a shell 47 enclosing the shaft kiln 49. Thus, direct heating is employed rather than indirect heating by the hot combustion gases.

Referring to Fig. 3, there is shown a modification wherein dispersions of oil shale and calcium carbonate are separately formed, and then are ground by discharging two separately constituted opposed jets against one another. The coarse calcium carbonate particles are mixed with water in a tank 53 and passed through a heating coil 55 arranged within a heater 57, to vaporize the water and form a flowing dispersion of solid particles in steam which is then passed through a conduit 59 to a nozzle 61 in a grinder 63. Concurrently, coarse oil shale particles are mixed with water in a tank 67 and passed through a heater coil 69 within a heater 71, to form a dispersion which flows through a conduit 73 to a nozzle 75 diametrically opposed to the nozzle 61. The resulting two jets of dispersion flow at high velocity against one another at 180° to disintegrate the oil shale and calcium carbonate particles, which then mix intimately together within the grinder head 63 and pass through a conduit 77 to a cyclone separator 79. Steam leaves the top of the separator and hot dry solid particles leave the bottom and pass through a shaft kiln 81 to form the clinker.

Hot gases in excess of 1000° F. pass from kiln 81 through the two conduits 83 and 85 to the respective heaters 67 and 71 wherein they heat the slurries and dispersions, with or without augmentation by other heating means.

*Example III*

A 1:1 water slurry of the same oil shale as in Example I is made up in slurry tank 67 and passed through a heater coil 69 under the same conditions as in Example I, to form a steam dispersion which flows to a nozzle 75 having a 5/32" orifice.

Meanwhile, a second 1:1 water slurry of crushed limestone is made up in a second slurry tank 53. The limestone slurry is passed at a rate of 1440 lbs. per hour through a second heater coil 55 wherein it is heated to a maximum temperature of 700° F., to vaporize the water and form a steam dispersion which flows to a nozzle 61 having a 7/32 inch orifice.

The two streams of dispersion collide at 180°, and the particles are so reduced in size that 98% pass through a 325 mesh sieve.

The resulting intimate mixture of oil shale and limestone particles together with low pressure steam then flows to a cyclone separator 79, from which steam passes off the top and the cement premix is discharged from the bottom into a shaft kiln 81 for sintering as described in Example I. The Portland cement product has the same analysis as in Example I.

Referring to Fig. 4, coarse particles of calcium carbonate and oil shale in the proper proportions for cement are mixed with water in a slurry tank 91, and then are ground as described previously.

After separation of the steam from the mixed ground particles in a separator 93 the hot dry solids pass continuously into a synthesis gas generator 95 wherein the organic content of the oil shale is partially or incompletely oxidized with oxygen to form a mixture of hydrogen and carbon monoxide which can be purified and used for synthesis of ammonia or methanol or any other purpose. The heat of oxidation sinters the Portland cement ingredients to form clinker particles which drop into a quenching pool 97 of water in the bottom of the generator. Temperature in the generator is usually between 2000 and 3000° F., preferably in excess of 2500° F.

The resulting slurry of clinker particles in water is then pumped through a conduit 99 into a pipe coil 101 in a heater 103 wherein water is vaporized and a dispersion of clinker particles in superheated steam is formed. This dispersion then flows in high velocity turbulent flow through a conduit 105 to a separator 107, from the bottom of which Portland cement in finished ground form is removed, and from the top of which the steam is discharged.

Steam is reliquefied in a condenser 109 and returned through a conduit 111 to generator 95.

Heating of the pipe coil 101 is at least partially accomplished by passing the hot synthesis gas (hydrogen and carbon monoxide) from generator 95 through heater 103.

Quenching of the clinker in water is not detrimental because such a short time elapses between the quenching step and the formation of a steam dispersion in coil 101 that only a minor amount of hydration, if any, occurs. Residence time of the clinker particles in water normally is less than two minutes and rarely will exceed five. If desired, hydration may be completely avoided by employing a hydrocarbon liquid such as kerosene for the quench.

*Example IV*

A slurry comprising 720 lbs. of limestone, 400 lbs. of oil shale and 1120 lbs. of water is made up in tank 91 and passed continuously at 600 pounds per square inch and 550 pounds per hour through a heater coil 90 wherein it is heated to a maximum temperature of 750° F. prior to discharge. The resulting dispersion of solids in steam passes to an opposed nozzle grinder 92 wherein the solid particles are so disintegrated that 98% pass through a 325 mesh sieve. Thereafter the ground particles in steam flow to a cyclone separator 93 wherein 80% of the steam is separated and passes off the top, while the remaining steam is discharged from the bottom along with the solid particles.

The solid particles and remaining steam enter a synthesis gas generator 95 operated at a pressure of 300 p.s.i.g. and a temperature of 2600° F., in which high purity gaseous oxygen combines with the combustible content of the oil shale to generate heat. Partial combustion of the oil shale's organic content occurs and a hot synthesis gas comprising mainly carbon monoxide, carbon dioxide, hydrogen is discharged from the generator.

The coarse particles of cement slag resulting from generator operation enter a pool 97 of quenching water in the bottom of the generator and form a slurry which is pumped continuously through a 400 foot long heater coil of 101 of ½ inch pipe wherein it is heated to a temperature of 600° F. by the heat from the synthesis gas together with auxiliary heat supplied by an oil burner. The resulting dispersion of cement slag in steam passes at high velocity and in turbulent flow through the remainder of the coil and is disintegrated so that 98% will pass through a 325 mesh sieve.

The dispersion then enters cyclone 107 from which steam leaves at the top and the hot dry Portland cement product leaves at the bottom.

Spent oil shale from which the kerogen content has been distilled previously, can also be employed in the process of the invention by fortifying it with a combustible material. An advantageous procedure is to use a combustible liquid in the initial flowable mixture (alone or mixed with water), and to retain it when feeding the cement premix to the sintering step in any of the procedures illustrated in Figs. 1 to 4, inclusive. Heavy fuel oil or even shale oil can be thus employed.

For example, in the process as illustrated in Fig. 4, the slurry liquid in tank 91 can be composed of equal parts by weight of water and heavy fuel oil which are intimately mixed with spent shale and limestone by agitation. The resulting steam is removed at cyclone 93 after cooling and condensation of any fuel oil vapors, and the fuel oil passes into synthesis gas generator 95 along with the solids, where it is burned to sinter the cement ingredients and concurrently generate hydrogen and carbon monoxide.

Another advantageous procedure for fortifying the spent oil shale is to mix it with fresh oil shale which is rich enough in kerogen to supply heat for the sintering operation. Thus, a flowable mixture can be made up and processed in the manner described in Example IV to produce cement and synthesis gas using equal parts of spent shale and fresh Utah shale of the type mentioned in Example II.

In the procedures described in detail above, disintegration of the oil shale particles is helped greatly by the spontaneous decrepitating action of the heated liquid on the particles, which supplements the disintegration caused by impingement of the particles forcibly against one another after discharge from the impingement nozzles.

The decrepitating action of hot liquids is especially marked when lumps of shale of about ¼ inch diameter or larger are soaked in the liquid for a short period of time such as 1 to 30 minutes at temperature before admission to the heating coil. This can be accomplished by maintaining a high pressure such as 400-1500 pounds per square inch on the slurry tanks shown in Figs. 1 to 4, inclusive, while heating the water, oil or other liquid in the tank to a high temperature such as 500-1000° F. at which it is still predominantly liquid. The slurry of shale in liquid can be heated, or the shale can be introduced into the previously heated liquid from a pressurized lock hopper.

While the invention has been described above primarily as including the grinding of the cement ingredients as an important part of the process, the principles are also advantageous for preparing an intimate cement premix and feeding it to a sintering zone, with or without synthesis gas generation, even when the flow conditions are such that little disintegration occurs.

The cement product derived by our novel process is characterized by the presence of a small quantity of residual carbon distributed quite uniformly therein. The quantity of carbon will vary with the type of oil shale and the temperature of operation, but usually will be less than 1% by weight. Consequently, the cement product has superior water wettability which is an asset for subsequently making concrete.

Obviously, many modifications and variations of the invention, as hereinbefore set forth, may be made without departing from the spirit and scope thereof, and therefore only such limitations should be imposed as are indicated in the appended claims.

We claim:

1. A process for making cement comprising forming a flowable mixture comprising coarse particles of oil shale in a vaporizable liquid, said oil shale containing combustible organic material and said vaporizable liqud being characterized by the ability to evaporate to a vapor which does not interfere with the combustion of said combustible organic material in said oil shale; passing said mixture through an elongated tubular heating zone; heating said mixture during passage through said tubular zone to a temperature above the boiling point of the liquid component of said mixture, thereby vaporizing said liquid component and forming a dispersion of solid particles of oil shale in resulting vapor; passing said dispersion through a succeeding zone of high velocity flow while subjecting the flowing stream therein to turbulence and a velocity sufficient to effect disintegration of said coarse particles to fine particles; passing said fine particles in mixture with particles of calcareous material to a second heating zone; firing said mixture and converting the organic content of said oil shale to hydrogen and carbon monoxide by oxidation thereof in said second heating zone; sintering said particles at least partially by the heat of oxidation of the organic material in said oil shale; and discharging the resulting cement clinker from said second heating zone.

2. A process in accordance with claim 1, also comprising quenching the cement clinker from said second zone by mixture with a vaporizable liquid and forming a second flowable mixture of coarse clinker particles therewith; passing said second flowable mixture through an elongated tubular heating zone; heating said second flowable mixture to a temperature above the boiling point of said liquid, thereby vaporizing said liquid and forming a second dispersion of said clinker particles therein; passing said second dispersion through a succeeding zone of high velocity flow and subjecting the flowing stream therein to turbulence and a velocity sufficient to effect disintegration of said clinker particles; separating the vapor from said ground clinker particles; and withdrawing said ground clinker particles as the cement product.

3. A process in accordance with claim 2, also comprising passing hot carbon monoxide and hydrogen gases from said second zone in heat exchange relationship with at least one of said flowable mixtures to heat said mixture.

4. A process for the concurrent manufacture of cement and synthesis gas comprising forming an intimate mixture of finely divided particles of oil shale and calcareous material; passing said mixture into a synthesis gas generator; oxidizing the organic content of said oil shale particles to hydrogen and carbon monoxide in said generator, while heating and sintering said solid particles by the heat of said oxidation to form particles of cement clinker; quenching said clinker particles in a vaporizable liquid and forming a flowable mixture therewith; passing said flowable mixture through an elongated tubular heating zone; heating said mixture during passage through said tubular zone to a temperature above the boiling point of said liquid, thereby vaporizing said liquid and forming a dispersion of solid particles in the resulting vapor; passing said dispersion through a succeeding zone of high velocity flow while subjecting the flowing stream thereinto to turbulence and a velocity sufficient to effect disintegration of said clinker particles; and separating the vapor from the disintegrated clinker particles.

5. A process in accordance with claim 4 wherein said vaporizable liquid is a hydrocarbon liquid.

6. A process in accordance with claim 4 wherein said vaporizable liquid is water.

7. A process in accordance with claim 4 wherein said flowable mixture is heated at least partially by passing the synthesis gas from said generator in heat exchange relationship therewith.

8. A process for making cement comprising introducing lumps of oil shale containing combustible organic material into a hot vaporizable liquid characterized by the ability to evaporate to a vapor which does not interfere with the combustion of said combustible organic material in said oil shale; soaking said oil shale lumps in said vaporizable liquid at a temperature of 500 to 1000° F. and a pressure high enough to maintain the liquid state and for a sufficient length of time to cause said lumps to decrepitate spontaneously, thereby forming a flowable mixture of decrepitated coarse particles of oil shale in said vaporizable liquid; passing said mixture as a flowing stream into and through a heating zone; heating said mixture during passage through said heating zone to a temperature above the boiling point of the liquid component of said mixture, thereby vaporizing said liquid component and forming a flowing dispersion of solid particles of oil shale in resulting vapor; passing said dispersion through a succeeding zone of high velocity flow while subjecting the flowing stream therein to turbulence and a velocity sufficient to disintegrate said coarse particles to fine particles; passing said fine particles in mixture with particles of calcareous material to a second heating zone; firing said mixture of particles and sintering said particles; and discharging the resulting cement clinker from said second heating zone.

References Cited in the file of this patent

UNITED STATES PATENTS

| | | |
|---|---|---|
| 387,588 | Gostling | Aug. 7, 1888 |
| 1,184,656 | Newhouse | May 23, 1916 |
| 1,784,840 | La Forge | Dec. 16, 1930 |
| 2,170,265 | Karwat | Aug. 22, 1939 |
| 2,409,707 | Roltheli | Oct. 22, 1946 |
| 2,592,468 | Rex | Apr. 8, 1952 |
| 2,609,283 | Kalbach | Sept. 2, 1952 |
| 2,704,635 | Trost | Mar. 22, 1955 |
| 2,735,787 | Eastman et al. | Feb. 21, 1956 |

FOREIGN PATENTS

| | | |
|---|---|---|
| 423,043 | Great Britain | Jan. 24, 1935 |
| 713,050 | France | Oct. 17, 1931 |